United States Patent [19]
Laskaris

[11] 3,991,587
[45] Nov. 16, 1976

[54] METHOD OF SUPPLYING CRYOGENIC FLUID THROUGH A TRANSFER JOINT EMPLOYING A STEPPED BAYONET RELATIVE-MOTION GAP

[75] Inventor: Evangelos T. Laskaris, Schenectady, N.Y.

[73] Assignee: General Electric Company, Schenectady, N.Y.

[22] Filed: Feb. 27, 1976

[21] Appl. No.: 662,103

Related U.S. Application Data
[62] Division of Ser. No. 573,169, April 30, 1975.

[52] U.S. Cl. ............................................ 62/55; 62/505; 310/54; 310/61; 285/47; 285/DIG. 5
[51] Int. Cl.² ............................................ F17C 7/02
[58] Field of Search ............ 62/55, 499, 505; 310/54, 61; 285/47, DIG. 5

[56] References Cited
UNITED STATES PATENTS

| | | |
|---|---|---|
| 3,626,717 | 12/1971 | Lorch .................................. 62/505 |
| 3,775,989 | 12/1973 | Mursinna et al. .................... 62/55 |
| 3,823,569 | 7/1974 | Sellmaier et al. ................... 62/55 |
| 3,845,639 | 11/1974 | Smith et al. ......................... 62/505 |

*Primary Examiner*—William E. Wayner
*Assistant Examiner*—Ronald C. Capossela
*Attorney, Agent, or Firm*—Marvin Snyder; Joseph T. Cohen; Jerome C. Squillaro

[57] ABSTRACT

Cryogenic liquid coolant is transferred from a stationary liquefier through a bayonet to a conduit rotating with the rotor of a superconducting generator, using a cryogenic fluid transfer joint attached to the collector end of the rotor. A relative-motion gap about the bayonet has its inner and outer diameters reduced in size near the outlet end of the bayonet. The gap thus stepped downward in size extends into a core of boil-off coolant within the rotating conduit, preventing liquid coolant centrifugally forced against the inside of the conduit from entering the gap, and allowing only boil-off coolant to enter.

2 Claims, 5 Drawing Figures

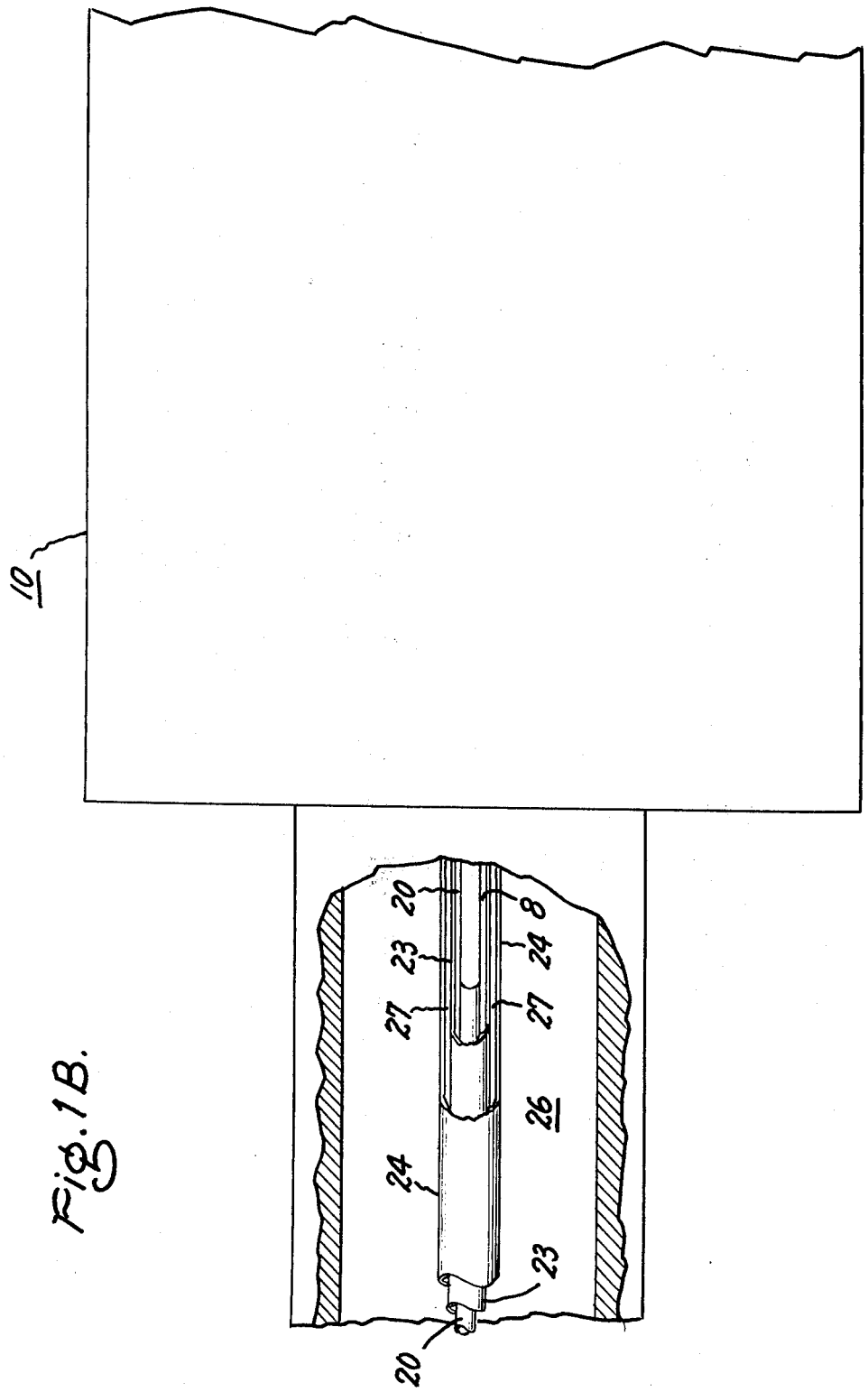

FLOW FROM COOLANT SOURCE

METHOD OF SUPPLYING CRYOGENIC FLUID THROUGH A TRANSFER JOINT EMPLOYING A STEPPED BAYONET RELATIVE-MOTION GAP

This is a division of application Ser. No. 573,169, filed Apr. 30, 1975.

INTRODUCTION

This invention relates to electrical machines employing superconducting rotors and more particularly to a method for transferring coolant from a stationary source to such rotors.

In electrical generators having superconducting rotors, the windings are bathed in a pool of very cold liquefied gas, e.g., liquefied helium, which absorbs heat from the windings and consequently evaporates to its gaseous form. Typically the generator is paired with a turbine and the rotor of one is connected to that of the other. The portion of the generator rotor connected to the turbine rotor is the "driven" end and the portion at the opposite end of the generator is the "undriven" or collector end of the generator rotor.

It is necessary to provide means for connecting to the rotor winding pool the device which liquefies the coolant, both to supply coolant to the winding pool and to recover evaporated coolant for reliquefication. The windings rotate, while the liquefier is stationary and external to the generator. Accordingly, the suppy of liquid coolant is connected to the conduits within the generator, which serve the winding pool, through a fluid transfer joint between rotating and nonrotating elements. Seals are provided to isolate the coolant from contamination by the rotor bearing lubricant, and to minimize leakage of the coolant between inlet and return gas streams, between multiple return gas streams, and to the environment. Such seals have heretofore comprised rotating and nonrotating elements which contact and rub upon one another. These seals must be replaced on a frequent basis, e.g., after each 300 hours of generator operation. Moreover, a system must be provided to bleed off a portion of the returning coolant gas stream from beside the seal adjacent the bearings, in order to prevent contamination of the coolant and the liquefier with bearing lubricant.

The shorter life of a contacting or rubbing seal is due to wear which is increased by slight eccentricity in rotor rotation. Since cryogenic fluid transfer joints have conventionally been fixed on stable, stationary bases, any eccentric movement of the rotor does not correspondingly move the base on which the joint is mounted. Accordingly, the eccentric movement locally increases wear-producing rubbing between the rotating and nonrotating portions of the contacting seals of conventional cryogenic fluid transfer joints.

Helium cooling for superconductive rotor applications should preferably include a counterflow, vapor-cooling arrangement for maintaining incoming liquid helium at cryogenic temperatures. A liquefier cycle for cryogenic cooling, where liquid helium at 4.2° K is delivered to the rotor and gaseous helium at room temperature is returned to the liquefier, is also preferably included.

In a desirable helium cooling system for superconductive rotor applications, helium mass flow rates that can be supplied through the rotor should be independent of rotor speed, such that cooldown at low speed can be performed. The system should be capable of performing properly at different mass flow rates, and coolant flow should be controlled accurately such that the minimum required flow is supplied. For high efficiency, vapor supplied with the liquid, or released from it through any transport process, should also be used for cooling.

Safe operation of the helium transfer joint requires that leakage of helium through the joint be limited to gas only, and that subatmospheric pressures in the central transfer tube, which can cause excessive leakage rates of warm helium into the 4.2° K region and reduce the cooling capacity of cold helium, be prevented.

Transfer of liquid helium from a stationary liquefier to a generator rotor requires an interface connection for the stationary and rotating helium streams. A helium-tight transfer joint, mounted at the undriven end of the generator rotor, functions to deliver liquid helium with a minimum of boil-off, from a stationary to a rotating reference frame, and to return room temperature, dry helium gas (in two separate streams) with an acceptably minimal level of contamination and pressure drop.

Some of the design requirements for helium transfer joints actually conflict with each other. Included among such requirements are long seal and bearing life vs. minimum contamination of the helium with bearing and seal lubricants, low vibration vs. low boil-off of the liquid helium due to conduction heat transfer in the conduit supports, and low radiation heat leak to the liquid helium vs. design simplicity.

The cryogenic fluid transfer joint described herein is comprised of rotating conduits or tubes contained in a rotating shaft affixed, as by bolting, to the hollow undriven end of the generator rotor. Stationary bearing and seal housings, and a stationary bayonet are also included. Liquid helium is delivered through the bayonet to rotating, liquid-inlet tubing. The bayonet is cooled by allowing boil-off gas to leak through a relative-motion gap surrounding the bayonet. Clearance seals and a pressure control port provide a means of controlling this leakage. Return gas from the rotor is contained in two streams and flows through ports in the shaft into the stationary housing. A clearance seal between the two returning streams allows the streams to be externally valved independently if desired.

The inner and outer diameters of the relative-motion gap are of reduced size near the outlet or discharge end of the bayonet. The gap thus reduced in size extends into a core of boil-off coolant within the rotating, liquid-inlet tubing. This prevents liquid coolant, centrifugally forced against the inside wall of the rotating, liquid-inlet tubing, from entering the gap, and allows only boil-off coolant to enter the gap.

One object of the invention is to provide a joint for transferring coolant to and from the rotor of a superconductive generator, while keeping mass flow of liquid coolant to the rotor essentially equal to the amount needed to replenish coolant that has boiled off.

Another object of the invention is to provide a joint for transferring coolant between a stationary supply thereof and the rotor of a superconductive generator wherein gasified coolant, separated centrifugally from liquid coolant, cools a bayonet through which liquid coolant is transferred.

In accordance with a preferred embodiment of the invention, coolant in liquid form is supplied to a conduit within, and rotating in unison with, the rotor of a superconducting generator through bayonet means contained in a cryogenic fluid transfer joint attached to the collector end of the rotor. The joint comprises a hollow shaft coupled to the rotor so as to be rotatable therewith. The conduit extends from the rotor into the hollow interior of the shaft, and the bayonet means penetrates into the interior of the conduit. An outer wall, rigidly coupled to the conduit and rotatable in unison therewith, is disposed concentrically about, and spaced apart from, the bayonet means so as to define a relative-motion gap therewith. Near the outlet end of the bayonet means, the outer wall is reduced in diameter, thereby reducing the outside diameter of the relative-motion gap. Thus the relative-motion gap communicates with a core of warmed, gasified coolant in the interior of the conduit, and liquid coolant centrifugally forced against the inside wall of the conduit is unable to gain access to the relative-motion gap. Accordingly, only gasified coolant flows through the relative-motion gap and in a direction opposite to the flow of liquefied coolant through the bayonet means, thereby helping to cool the bayonet means without unduly utilizing any liquefied coolant for this purpose.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 1A and 1B, when joined together, illustrate, in side elevation view, apparatus at the collector end of a superconductive A.C. generator rotor with some parts broken away to expose several interior details;

DESCRIPTION OF TYPICAL EMBODIMENTS

Figure 1A:
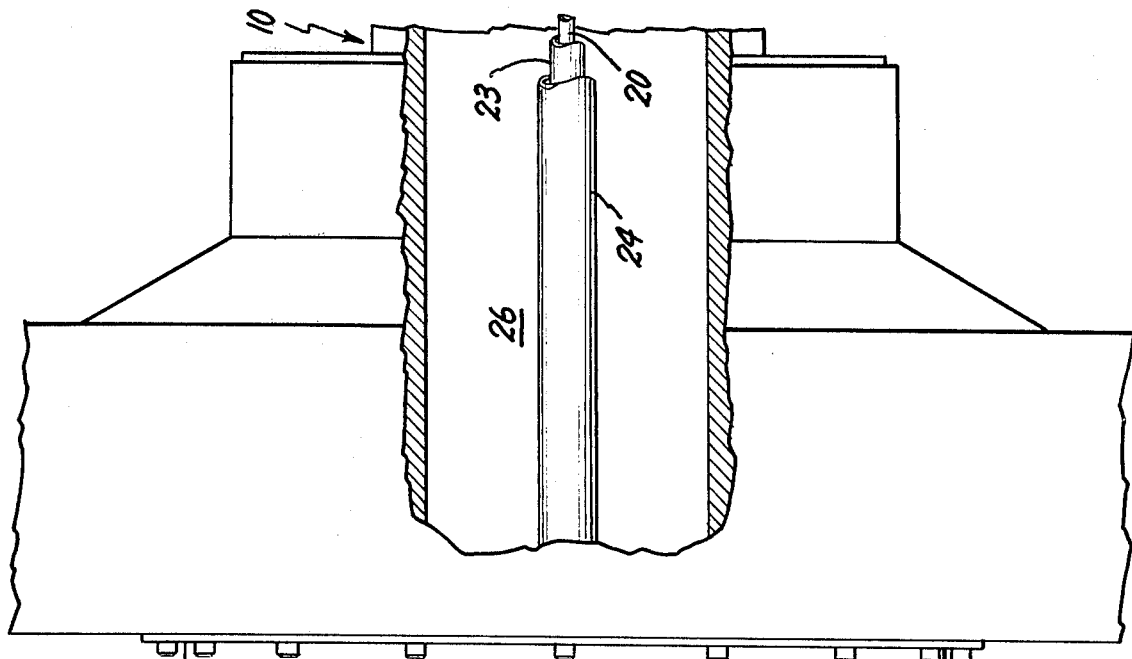
Figure 1A:
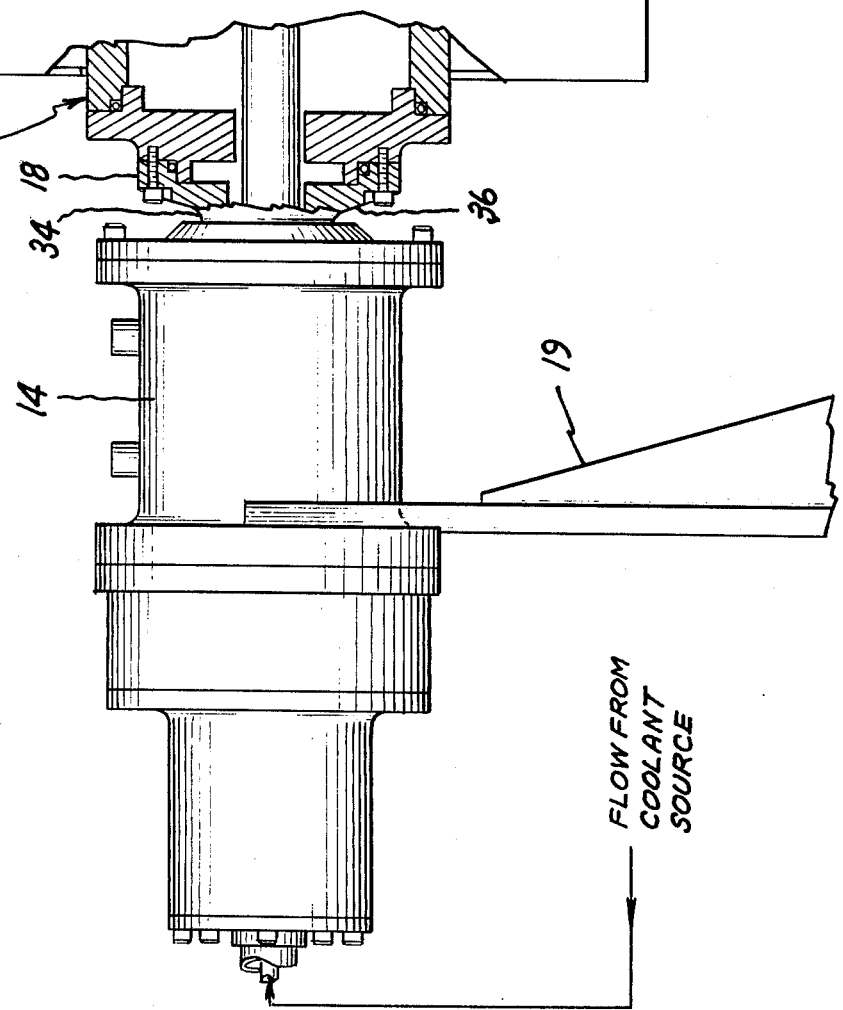

FIGS. 1A and 1B illustrate the nondriven or collector end of rotor 10 of a superconductive generator, to which a transfer joint 14 is secured. Joint 14 is shown supported, in cantilever fashion, axially leftwards from a securement 18 on the nondriven end of rotor 10. The joint may rest against a fixed support 19 which restrains the joint housing against rotation but permits the joint to vibrate with the rotor. The vibration may be accommodated either by keying the joint housing to support 19 to prevent rotation or, in those instances where permitted by both length of the cantilevered joint compared to its flexibility, and amount of vibration encountered, the housing may be secured to support 19.

Joint 14 provides an interface between a nonrotating liquid coolant source and a rotating system of coaxial conduits within rotor 10. The conduit system includes a rotating conduit 20 for supplying liquid coolant to the rotor windings (not shown). In E. T. Laskaris et al. application Ser. No. 573,168, filed concurrently herewith and assigned to the instant assignee, a method and apparatus for supplying liquid coolant to the rotor windings are described and claimed.

A vacuum jacket 8, formed by a conduit 23, surrounds conduit 20 and is in turn surrounded by a conduit 24 for returning evaporated coolant from the collector end of the rotor. Evaporated coolant from the driven end (not shown) of rotor 10 is forwarded to region 26 outside conduit 24, and flows through annulus 26 to joint 14. The returning evaporated coolant is collected in two streams, allowing cooling of the driven and collector ends of the rotor to be equalized by independently controlling flow of the gasified coolant outlet streams emerging from joint 14.

Figure 2:
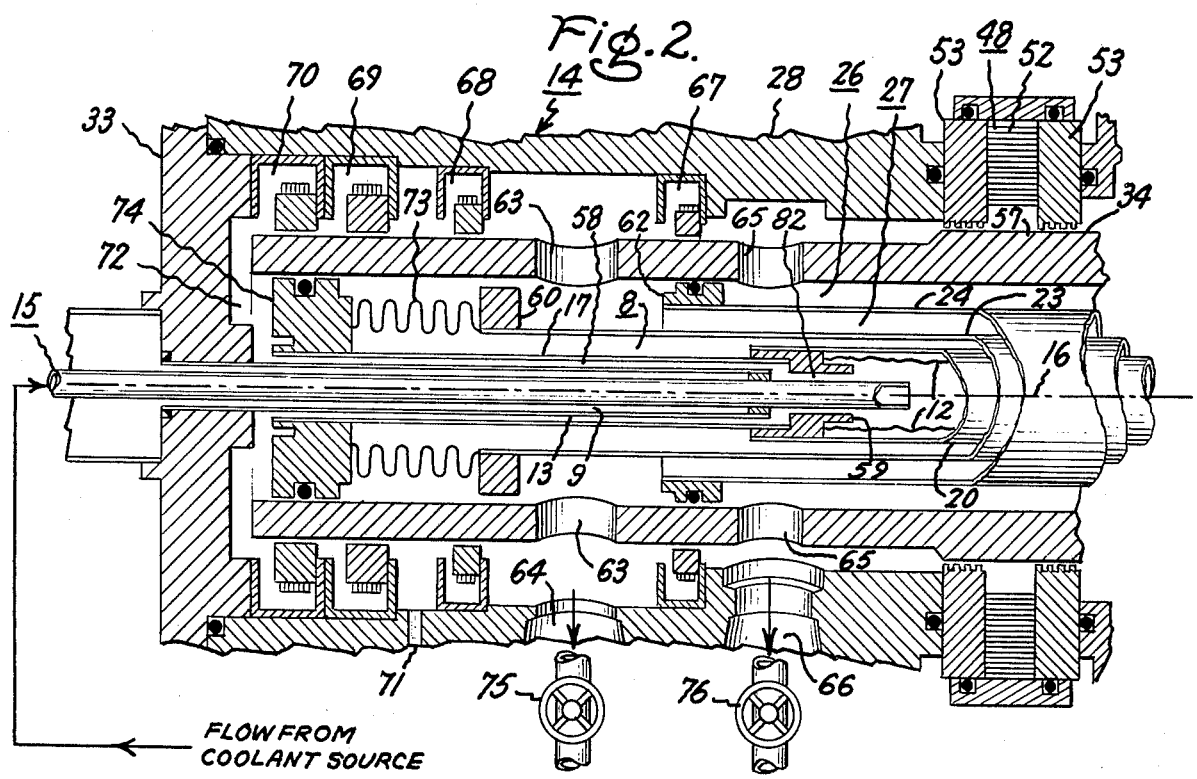
FIG. 2 is a longitudinal sectional view of the rotating, cryogenic joint in the region of a relative-motion gap.

As shown in FIG. 2, liquefied coolant is supplied to joint 14 through a hollow tubular bayonet 15 from a source (not shown) which may be a liquefier. Evaporated coolant returning from the rotor leaves the transfer joint at ports 64, 66 through flow control valves 75, 76, respectively, and is recycled to the liquefier. The coolant usually employed is liquid helium at 4.2° K, by way of example, and may be supplied at slightly above atmospheric pressure, e.g., at 17 lbs. per square inch, to assure adequate delivery of coolant liquid through the joint.

Joint 14, as shown in FIG. 2, includes a stationary housing assembly 28 and a rotating tubular shaft 34 extending closely to end cover 33. As shown in FIG. 1A, hollow shaft 34 is provided with a flange 36 which may be bolted to rotor 10 so that the shaft rotates with the rotor. The shaft is journaled on axially-spaced ball bearing assemblies (not shown).

In shaft 34, as shown in FIG. 2, bayonet 15 protrudes coaxially into coolant supply tube 20. Liquid coolant flowing through bayonet 15 on rotor centerline 16 is deposited on the inner surface of conduit 20 to form an annulus 12 of liquid on the conduit wall, which extends into the rotor. An annular step or dam 59 is provided inside, and sealed to, rotatable conduit 20. Dam 59 is disposed radially about, and spaced slightly apart from, the discharge end of stationary bayonet tube 15. The outer diameter of relative-motion gap 82 between step 59 and bayonet 15, being smaller than the inner diameter of liquid annulus 12, ensures that any backflow of coolant admitted to relative-motion gap 82 is limited to gas. Such coolant gas entering gap 82 flows into a larger diameter portion 58 of the relative-motion gap surrounding bayonet 15 and delimited by a rotating outer wall 17 and a stationary inner wall 13 which, being sealed to the outer surface of bayonet 15 near its discharge end, forms the outer wall of a vacuum jacket 9 about the bayonet. Step 59 is rotatable in common with wall 17 and conduit 20. In B. D. Hatch application Ser. No. 573,170, filed concurrently herewith and assigned to the instant assignee, limitation of backflow coolant to the gaseous state only is instead achieved by using pressure of the boil-off coolant to prevent liquid coolant from entering a relative-motion gap about a bayonet while the boil-off coolant flows through the gap.

In order to insulate bayonet 15 so as to minimize heat absorption by the liquid coolant passing through the bayonet to enter rotating conduit 20, and thus to minimize boil-off of liquid coolant in the bayonet, nonrotating vacuum jacket 9 in joint 14 surrounds bayonet 15 over all but the region near the end where liquid coolant is discharged into conduit 20. By passing boiled-off coolant through bayonet relative-motion gap portion 58, outer wall 13 of vacuum jacket 9 is kept cooled so as to even further reduce heat absorption by the liquid coolant in bayonet 15.

Liquid helium from rotating tube 20, supplied at constant pressure slightly above atmospheric, is transferred to the collector end of rotor 10. Evaporation rate of the liquid helium which cools the rotor windings (not shown) determines not only the helium return flow rates through annuli 26 and 27, but also affects fluid discharge pressure in central tube 20 at the collector end of rotor 10.

Axial pressure drop, vibration, and heat leakage must all be taken into consideration in designing transfer joint 14. Conduction heat transfer considerations alone would make a bayonet of small diameter and large length preferable while vibration considerations alone would lead to a short bayonet of large diameter. In addition, the bayonet must be sized to avoid a large viscous pressure drop in the liquid helium coolant.

By way of example, bayonet 15 may comprise a 3/16 inch diameter inner tube of 0.020 inch wall thickness inside a ¼ inch diameter tube 13 of 0.016 inch thickness sealed to the outer surface of bayonet 15 near the discharge end of the bayonet to form vacuum jacket 9 about the bayonet. Bayonet 15 has sufficient flow cross section to make the liquid helium pressure drop negligible (for example, less than $10^{-3}$ pounds per square inch for a flow rate of 1 gram/second of liquid with 10 percent vapor). Relative-motion gap portion 58 may be 0.016 inch and rotating outer wall 17 may be 5/16 inch diameter × 0.016 inch wall thickness. The bayonet natural frequency exceeds 500 hertz, so vibration is not an important consideration.

Size of relative-motion gap portion 58 is chosen from consideration of convection loops which develop therein. An analysis of the convection loop heat leak around the bayonet shows that the contribution to bayonet heat by this mode of heat transfer is not significant for the chosen gap size. This analysis assumes no axial flow in the gap since axial flow past the bayonet tends to destroy the convection loops.

Step 59 near the discharge end of bayonet 15 accommodates another convection heat leak consideration. Flow in the rotating liquid-inlet stream is separated into a vapor core and a thin liquid film 12. Only a 0.020 inch thickness of film 12 in rotating liquid helium inlet tube 20 is required to sustain a flow of 1 gram/second from the bayonet to the rotor. If step 59 were absent, liquid coolant would tend to flow along the wall of conduit 20 into bayonet relative-motion gap portion 58 and thence out of joint 14, so that replacement of this lost liquid coolant would be necessary in order to maintain the 1 gram/second flow to the rotor.

Vacuum jacket wall 23 around coolant supply tube 20 extends axially leftwards past the end of tube 20 and is sealed to, and supported from, rotating tubular shaft 34 by a support ring 60. Tube 20 is supported with respect to outer wall 23 of vacuum jacket 8 by tube spacers (not shown).

Conduit 24 for returning coolant gas from the collector end of the rotor extends axially leftwards to a point short of ring 60, where a support ring 62 seals and supports conduit 24 with respect to rotating tubular shaft 34. Between rings 60 and 62, ports 63 are formed radially through shaft 34 and port 64 is formed radially through housing assembly 28. Coolant gas returning through annulus 27 from the windings at the collector end of the rotor passes out through port 64 of housing assembly 28 at a flow rate controllable by valve 75, and is collected for reliquefaction and reuse.

Coolant gas returning through annulus 26 from the driven end of the rotor passes out of rotating tubular shaft 34 through ports 65 formed radially through shaft 34. This coolant gas stream exits housing assembly 28 through port 66 at a flow rate controllable by valve 76. Relative cooling of the driven and collector ends of rotor 10 may be equalized by appropriate relative adjustment of valves 75 and 76.

A magnetic fluid seal 48 is provided to isolate the return gas stream exiting through port 66 from any air stream carrying bearing oil out of the transfer joint on the other side of the seal (not shown). Magnetic fluid seals, though a relatively recent development, are commercially available products. One source of supply is the Ferrofluidic Corporation, 144 Middlesex Turnpike, Burlington, Massachusetts.

Figure 3:
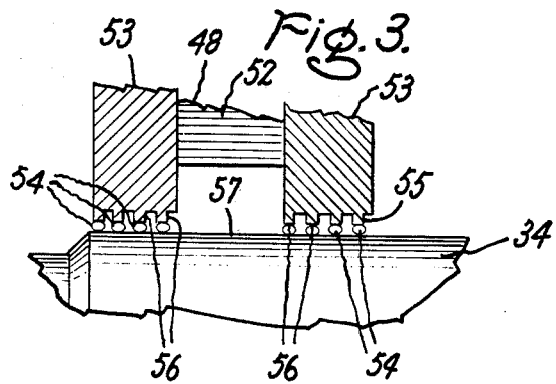
FIG. 3 is a sectional view showing a portion of the magnetic fluid seal in the joint.

Seal 48, as shown in FIG. 3, comprises a permanent magnet 52 flanked by two iron pole pieces 53 and a magnetic fluid 54. The seal exhibits a magnetic circuit completed by shaft 34 which is made of ferromagnetic material. The magnetic fluid comprises a low vapor pressure viscous oil containing colloidal iron oxide particles, and forms a positive seal with a finite, long life determined by the evaporation rate of the fluid. Surface 55 of each pole piece 53 is ribbed or otherwise provided with crests 56 which are gapped from exterior surface 57 of shaft 34. Magnet 52 causes the suspended magnetic particles in the magnetic fluid to align between crests 56 and surface 57 to fill each gap with fluid 54 and provide positive sealing.

Separation between the coolant gas streams is maintained by four clearance seals, 67, 68, 69 and 70, as shown in FIG. 2. Seal 67, disposed axially between ports 63, 64 and 65, 66, separates the coolant gas stream returning from the driven end of the rotor through annulus 26, from the coolant gas stream returning from the collector end of the rotor through annulus 27. Each of seals 68, 69 and 70 is situated between housing assembly 28 and shaft 34, on the side of ports 63 and 64 opposite seal 67. A bayonet leakage control port 71 through housing assembly 28 is provided between consecutive seals 68 and 69, while seal 70 is at the outermost portion of shaft 34. Bayonet leakage control port 71 permits control of the amount of boil-off gas which flows past step 59 and backflows over the outside of bayonet 15 in relative-motion gap portion 58 to a region 72 axially beyond a bellows 73 and slidable annular plug 74. The orifice of port 71 is pressurized to control the amount of backflow of coolant gas through relative-motion gap portion 58.

Bellows 73 and plug 74 terminate vacuum jacket 8. The bellows is sealed and secured to ring 60 and plug 74. The plug extends radially between the outside of tube 17 and the inside of shaft 34 and is in sliding sealing engagement with both. Thus the integrity of vacuum jacket 8 is preserved despite relative axial displacement that may result from vibration or temperature changes.

Figure 4:
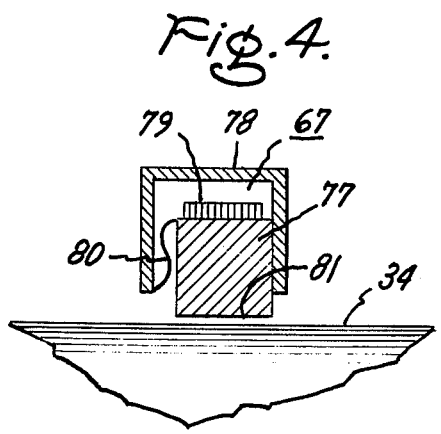
FIG. 4 is a sectional view showing one of the controlled gap seals in the joints.

Seal 67 is illustrated in greater detail in FIG. 4 as typical of seals 67-70. The main purpose of seal 67 is to permit independent valving of the returning coolant gas streams at valves 75, 76. Throttling at these valves can be used to distribute the cooling effect in rotor 10 more evenly. Pressure differential across seal 67 is typically on the order of a few pounds per square inch in either direction. Seal 67 comprises a stator 77 such as a compressed carbon ring designed to have the same coefficient of thermal expansion as shaft 34. Stator 77 is preferably housed in a seal housing member 78 of squared-off U-shaped section and backed therein by an expansion ring 79. A spring 80 holds stator 77 in place by axially loading the stator against one side of housing 78.

Gap 81 between carbon ring 77 and shaft 34 is on the order of a half mil whereas, if the transfer joint were fixedly mounted at each end instead of cantilevered from the generator rotor, a gap of 3–5 mils would be needed to avoid excessive wear.

The foregoing describes a joint for transferring coolant to and from the rotor of a superconductive generator, while keeping mass flow of liquid coolant to the rotor essentially equal to the amount needed to replenish coolant that has boiled off. The joint permits transfer of coolant from a stationary supply to the generator rotor whereby gasified coolant, separated centrifugally from its liquid phase, cools a bayonet through which liquid coolant is transferred. Transfer of coolant in this fashion is accomplished with high efficiency.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What I claim as new and desire to secure by Letters Patent of the United States is:

1. In the method of supplying only gasified coolant to a conduit from a chamber containing both liquefied and gasified coolant therein, said chamber having a coolant outlet, the steps of:
    rotating said chamber so as to centrifugally force the liquefied portion of said coolant outward against a wall of said chamber completely surrounding the axis of rotation of said chamber;
    pressurizing the interior of said chamber; and
    constricting the outlet of said chamber sufficiently to be narrower in diameter than the inner diameter of the liquefied coolant region in said chamber so as to allow egress of only gasified coolant from said chamber.

2. The method of claim 1 including the step of continually admitting into said chamber both liquefied and gasified coolant under pressure along the axis of rotation of said chamber.

* * * * *